United States Patent [19]

Svoboda

[11] Patent Number: 6,126,433
[45] Date of Patent: Oct. 3, 2000

[54] MOLDING INSTALLATION FOR THE PRODUCTION OF MOLDED PARTS FROM PLASTIC

[75] Inventor: Bruno Svoboda, Vienna, Austria

[73] Assignee: Maschinenfabrik J. Dieffenbacher GmbH & Co., Eppingen, Germany

[21] Appl. No.: 09/128,998

[22] Filed: Aug. 4, 1998

[30] Foreign Application Priority Data

Aug. 8, 1997 [DE] Germany .............................. 197 34 473

[51] Int. Cl.$^7$ ................................................. B29C 45/07
[52] U.S. Cl. ............................................ 425/557; 425/574
[58] Field of Search ....................................... 425/557, 574

[56] References Cited

U.S. PATENT DOCUMENTS

| | | |
|---|---|---|
| 2,834,051 | 5/1958 | Rekettye . |
| 4,867,665 | 9/1989 | Wada ....................................... 425/145 |
| 4,925,381 | 5/1990 | Aoki et al. ............................... 425/145 |
| 5,219,586 | 6/1993 | Yukihiro et al. ......................... 425/574 |

FOREIGN PATENT DOCUMENTS

| | | |
|---|---|---|
| 0 285 982 | 3/1988 | European Pat. Off. . |
| 0 333 198 | 9/1989 | European Pat. Off. . |
| 0 648 587 | 4/1995 | European Pat. Off. . |
| 0 743 160 | 11/1996 | European Pat. Off. . |
| 24 03 481 | 8/1975 | Germany . |
| 31 15 306 | 4/1982 | Germany . |
| 33 27 135 | 7/1983 | Germany . |
| 37 05 470 | 2/1987 | Germany . |
| 38 43 342 | 12/1988 | Germany . |
| 97/11829 | 4/1997 | WIPO . |

OTHER PUBLICATIONS

Patent Abstract of Japan, vol. 011, No. 011(M–550), abstract of JP 61–181618 pub. Aug. 14, 1986.

Patent Abstract of Japan vol. 015, (M–1103), abstract of JP 03–26517 pub. Feb. 5, 1991.

*Primary Examiner*—Tim Heitbrink
*Attorney, Agent, or Firm*—Foley & Lardner

[57] ABSTRACT

A molding installation for producing molded parts from plastic in which the molding compound is plasticized in an extruder unit and is introduced into the mold of a compression-molding unit by an injection unit. The extruder and one or more injection units are independent units arranged on a coordinate table. The extruder and injection units can be separated from and joined to one another such that one or more injection units can be releasably coupled to an extruder unit, then uncoupled from the extruder unit and moved toward one or more compression-molding units. Accordingly, two or more injection units can be filled using one extruder unit. Because the injection unit can be uncoupled from the extruder, only the significantly lower mass of the injection unit has to be moved in order to deposit the melt strand inside the mold, and thus it is possible to move the injection unit more quickly using less power. The small spatial requirements of the injection unit also make it possible to produce significantly smaller moldings.

19 Claims, 7 Drawing Sheets

MOLDING INSTALLATION FOR THE PRODUCTION OF MOLDED PARTS FROM PLASTIC

BACKGROUND OF THE INVENTION

1. Field of the Invention

The invention relates to a molding installation for producing molded parts from plastic in which an extruder unit plasticizes the molding compound such that the compound can be introduced by an injection unit into the mold of a compression-molding unit.

Such molding installations are used to produce molded parts from thermoplastic or thermosetting polymers or elastomers. The polymers may also be fiber-reinforced. The molded parts may be joined to sheets or textiles, in which case a strand of plasticized polymer melt is placed between the opened mold halves of a vertical press and is then press-molded together with the decorative material which has been introduced.

2. Description of the Related Art

European Patent 0 333 198 B1 describes a process in which the polymer melt is introduced into the mold during the closure operation. This has the drawback that the polymer melts which flow together during the compression operation do not join homogeneously to one another at the flow lines, resulting in weak points.

In a known molding installation in accordance with publication WO 97/11829, the polymer melt is plasticized with the aid of a screw plasticizing unit and is deposited in the mold by an injection unit, the injection unit moving backward during the plasticizing operation in accordance with the plasticized volume and the plasticized volume of material being stored in the cylinder chamber in front of the injection plunger. The screw plasticizing unit and injection unit then moves between the opened mold halves. During the return movement of the screw plasticizing and injection unit into its starting position, the injection plunger, by moving forward in the cylinder chamber, forces the plasticized material through a nozzle, the material being deposited into the mold in the form of a strand. The nozzle diverts the melt strand downward through 90° and brings it to the desired discharge width by means of a suitable passage shape. In order, in the case of parts with complicated shapes, to match the melt strand to the shape of the parts as far as possible, the screw plasticizing and injection unit can be moved both laterally and vertically and the nozzle can follow the cavity contour as accurately as possible.

Drawbacks of this molding installation which may be cited are:

The screw plasticizing units may weigh several tons, especially in the case of large volumes of polymer melt, and their speed of movement is therefore limited.

When a plurality of units (for a plurality of parts) are being used, the size of the units means that they impede one another.

When processing fiber-reinforced plastics, it is often necessary to use different screw plasticizing units from the single-screw units which are currently used for injection.

SUMMARY OF THE INVENTION

The invention is based on the object of providing a molding installation in which the abovementioned drawbacks are avoided or do not arise, in which only small units within the installation have to be moved and in which the unit which deposits the polymer melt and is of small and lightweight design can be moved between the mold halves in three axes.

This object is achieved according to the invention by a molding installation for producing molded parts from plastic in which the molding compound is plasticized in an extruder unit and can be introduced into the mold of a compression-molding unit by an injection unit. The extruder and injection units are independent units arranged on a coordinate table. The extruder and injection units can be separated from and joined to one another such that one or more injection units can be releasably coupled to an extruder unit, then uncoupled from the extruder unit and moved toward one or more compression-molding units.

According to present invention, the extruder and plasticizing unit is separate from the injection unit. As a result, two or more injection units can be filled using one extruder unit. For this purpose, the extruder unit is coupled mechanically to the injection units. The injection units, which then only comprise the injection plunger and the deposition nozzle, may be of smaller and more mobile design and can also run through more complicated contours than hitherto.

The molding installation according to present invention is distinguished by the fact that only the significantly lower mass of the injection unit has to be moved in order to deposit the melt strand inside the mold, and thus it is possible to move the injection unit more quickly using less power.

A further advantage consists in the fact that, owing to the small spatial requirements of the injection unit, it is also possible to produce significantly smaller moldings.

Since the plasticizing unit may be of fixed design, it is furthermore advantageous to design it in any desired position and in the optimum construction for the particular plastics to be processed.

BRIEF DESCRIPTION OF THE DRAWINGS

Further advantageous refinements of the invention, which are also specified in the subclaims, are described in more detail with reference to the drawing, in which:

DETAILED DESCRIPTION OF THE PREFERRED EMBODIMENT

Figure 1:
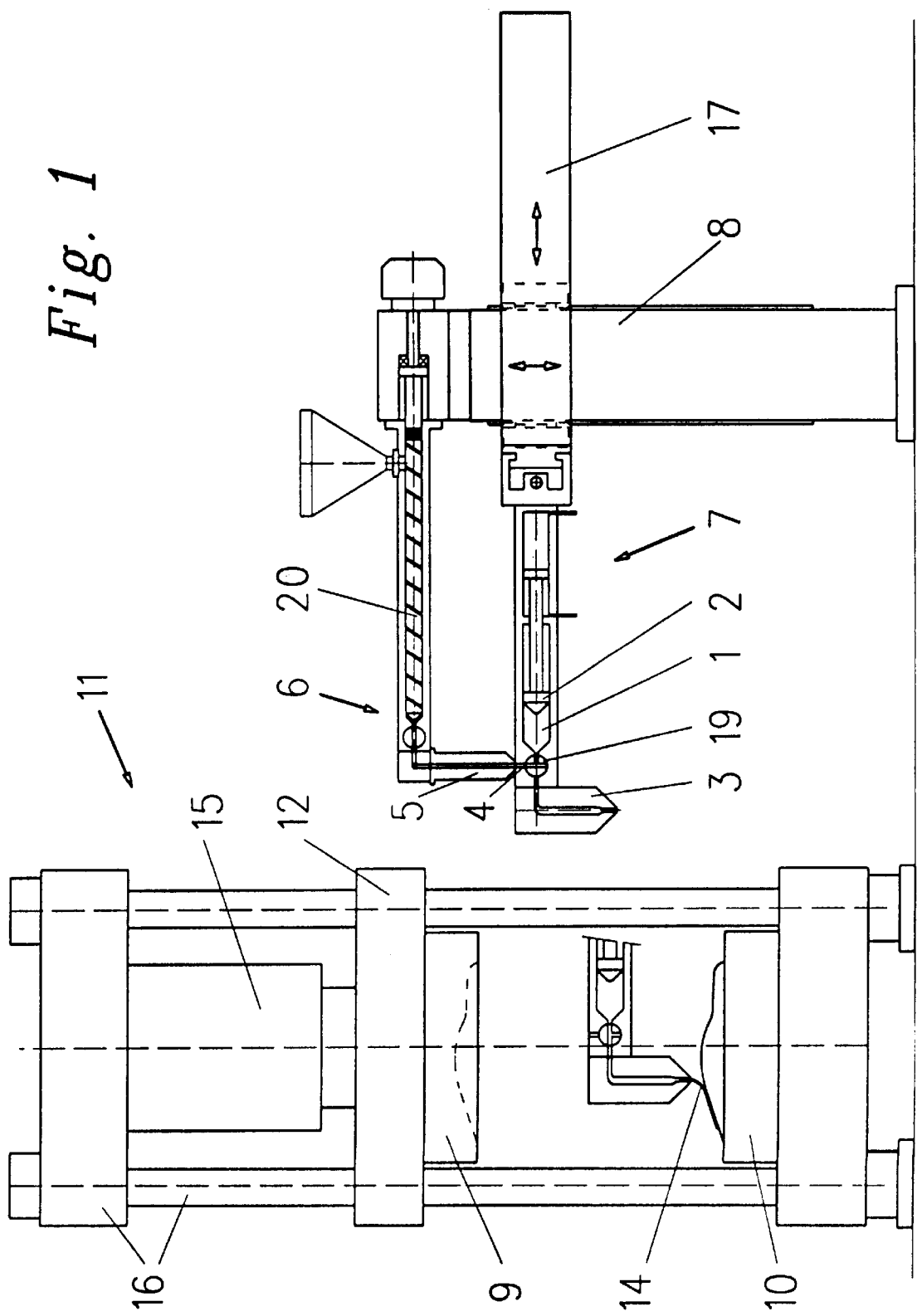
FIG. 1 shows a side view of the molding installation according to the invention.
Figure 2:
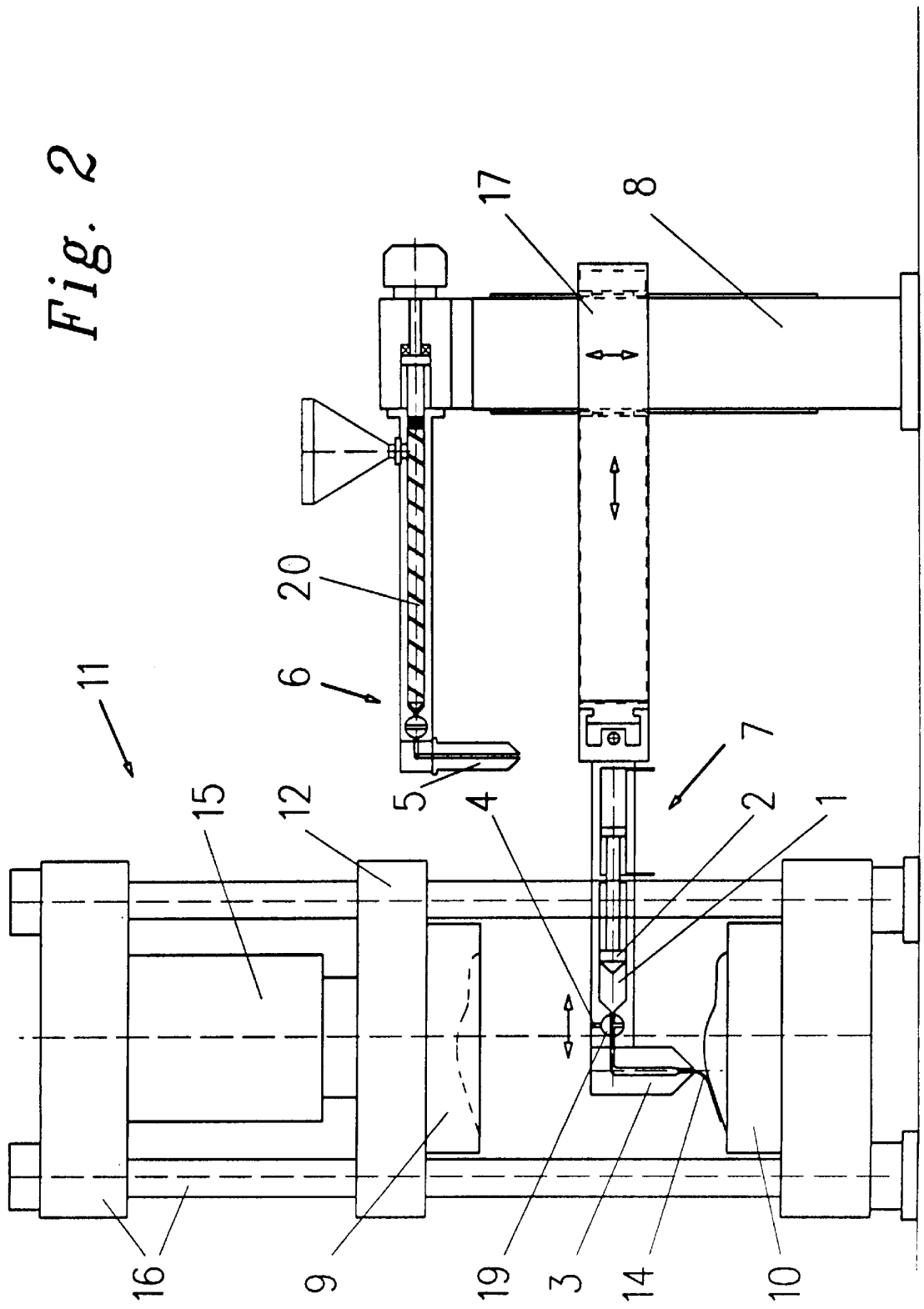
FIG. 2 shows the molding installation in accordance with FIG. 1 in separated arrangement, with the plasticizing unit fixed to the coordinate table and the injection unit in the process of depositing material in the molding unit.

In accordance with FIGS. 1 to 5, the main components of the inventive molding installation comprise the compression-molding unit 11, the coordinate table 8 with the extruder or plasticizing unit 6 which is installed fixedly thereon and the injection unit 7 which can be displaced in three axes by means of the guide rail 17 and can be uncoupled by lowering it from the plasticizing unit 6. The compression-molding unit 11 comprises the press frame 16, the compression-molding cylinder 15 and the mold-closing device 12, which opens and closes the mold 9 and 10.

Figure 3:
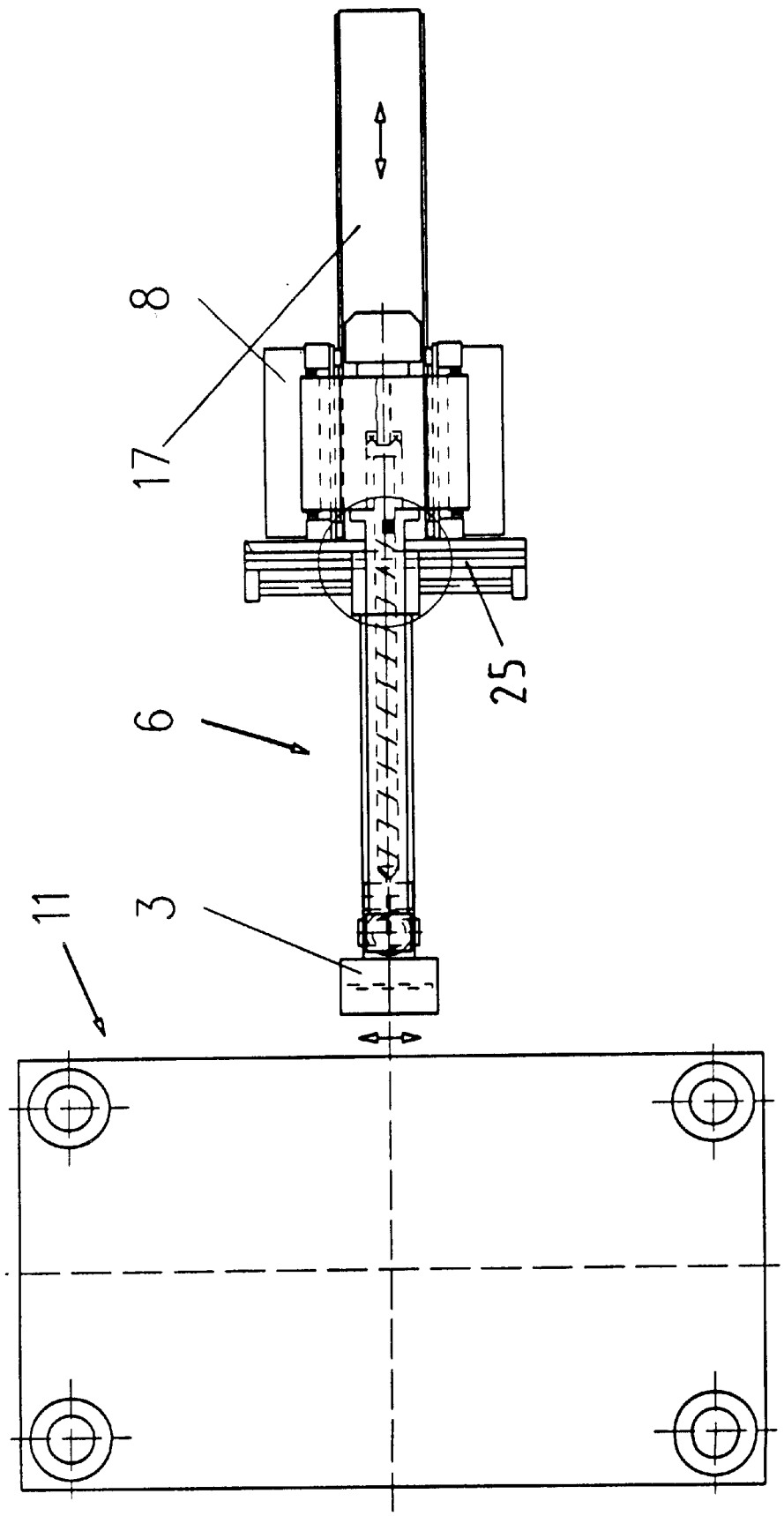
FIG. 3 shows a plan view of the molding installation in accordance with FIG. 1.
Figure 4:
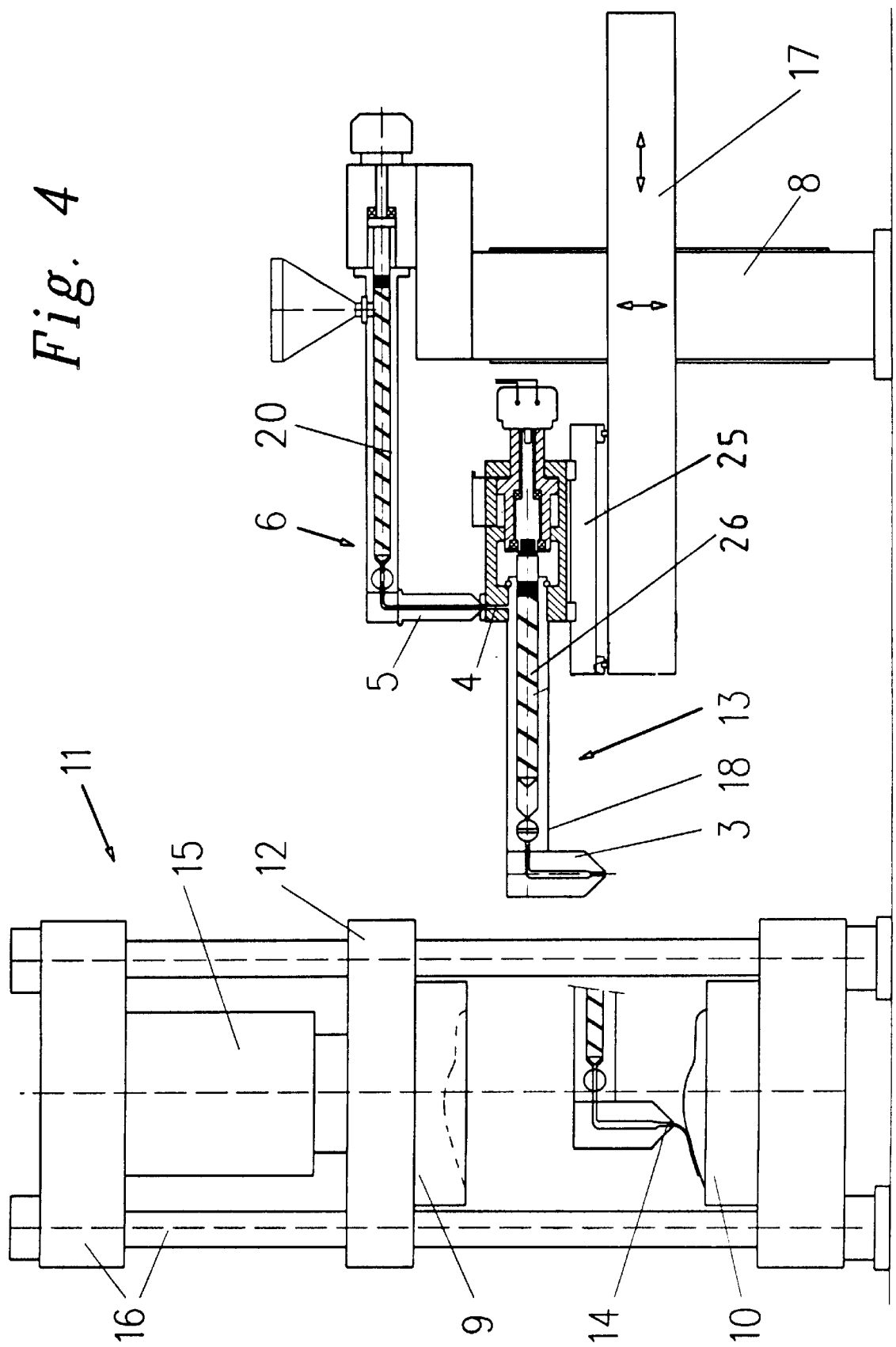
FIG. 4 shows the molding installation with a pre-extruder and the injection unit designed as a plasticizing and injection unit.
Figure 5:
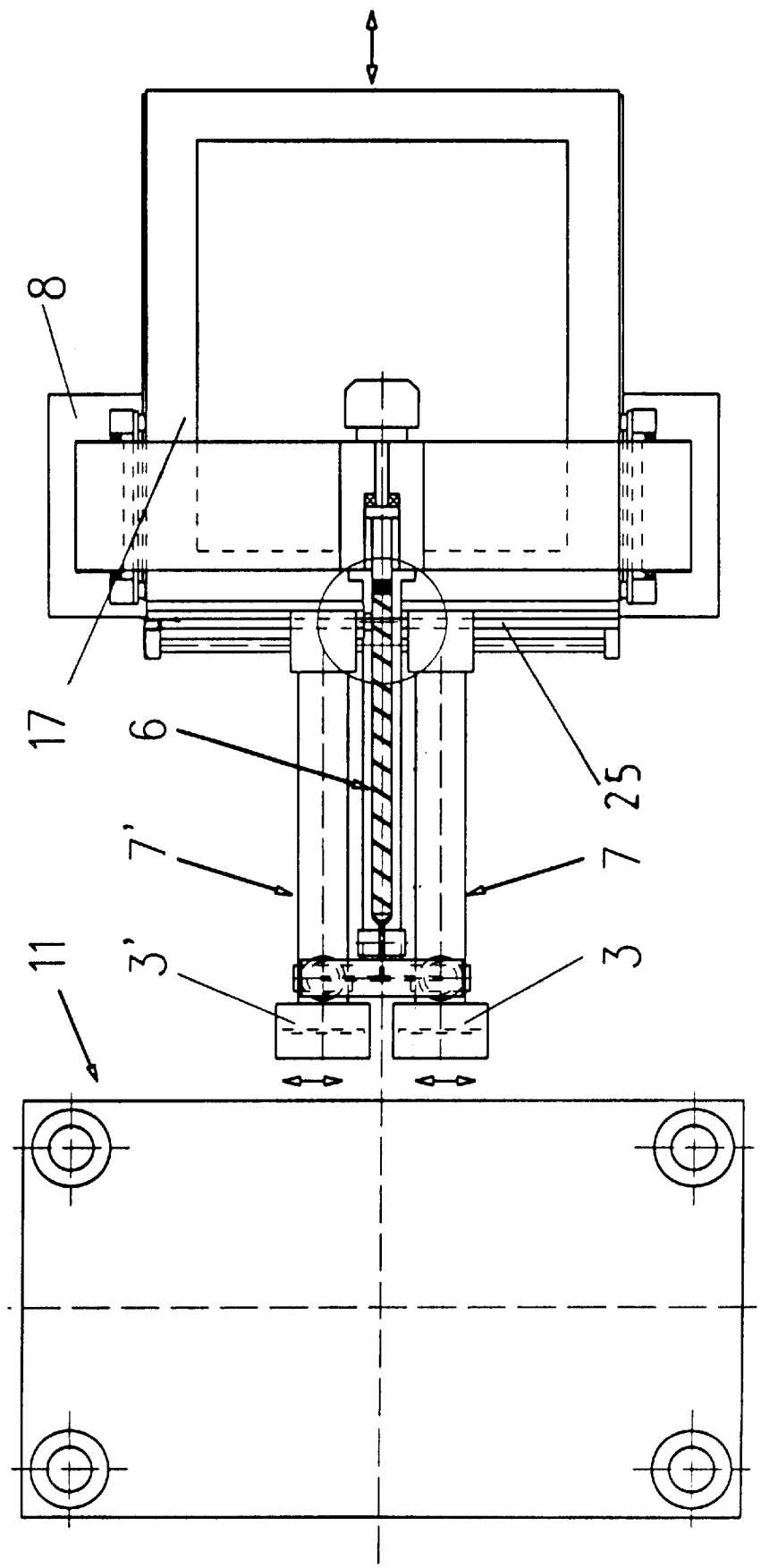
FIG. 5 shows a plan view of the molding installation with two injection units.

The mold comprises the movable female mold 9 and the stationary male mold 10. A cylindrical storage chamber 1 of the injection unit 7 is delimited on one side by a driven injection plunger 2, which is arranged to be axially displaceable therein, and on the other side by a deposition nozzle 3. The polymer melt is introduced through the plasticizing screw 20 into the storage chamber 1, through an orifice 4 with the aid of a fixed extruder 6, the die ring 5 of which is coupled to this orifice 4, or of a screw plasticizing unit the injection plunger 2 moving backward in accordance with the volume of material introduced. Once the required volume of material has been reached, the injection unit 7 is uncoupled from the die ring 5 of the extruder 6 and, with the aid of a guide rail 17 which is arranged on the coordinate table 8 and can be displaced longitudinally and raised and lowered, moves between the opened compression-molding unit 11. During the return movement, the driven injection plunger 2 ejects the molding compound from the storage chamber 1 through the deposition nozzle 3, a melt strand 14 being deposited on the lower stationary male mold 10. Then, the injection unit 7 couples back onto the extruder 6 via a two-way valve 19 and the operation is repeated. As illustrated in FIGS. 3, 4 and 5, the injection unit 7 is also arranged in such a manner as to be horizontally displaceable on a transverse rail 25 which is arranged on the guide rail 17.

For large installations, it may be expedient for a plurality of extruders 6 to be provided in a fixed, pivotable or displaceable position on the coordinate table 8, which extruders are arranged in such a manner that they can be moved between one or more compression-molding units 11. In order to be able to introduce the melt strand 14 into the mold 9 and 10 with sufficient heat, in a further expedient configuration in accordance with FIG. 4 the injection unit is designed as a plasticizing and injection unit 13 which can be heated and can eject the melt strand 14, having an ejection/plasticizing screw 26 and a plasticizing cylinder 18.

Figure 6:
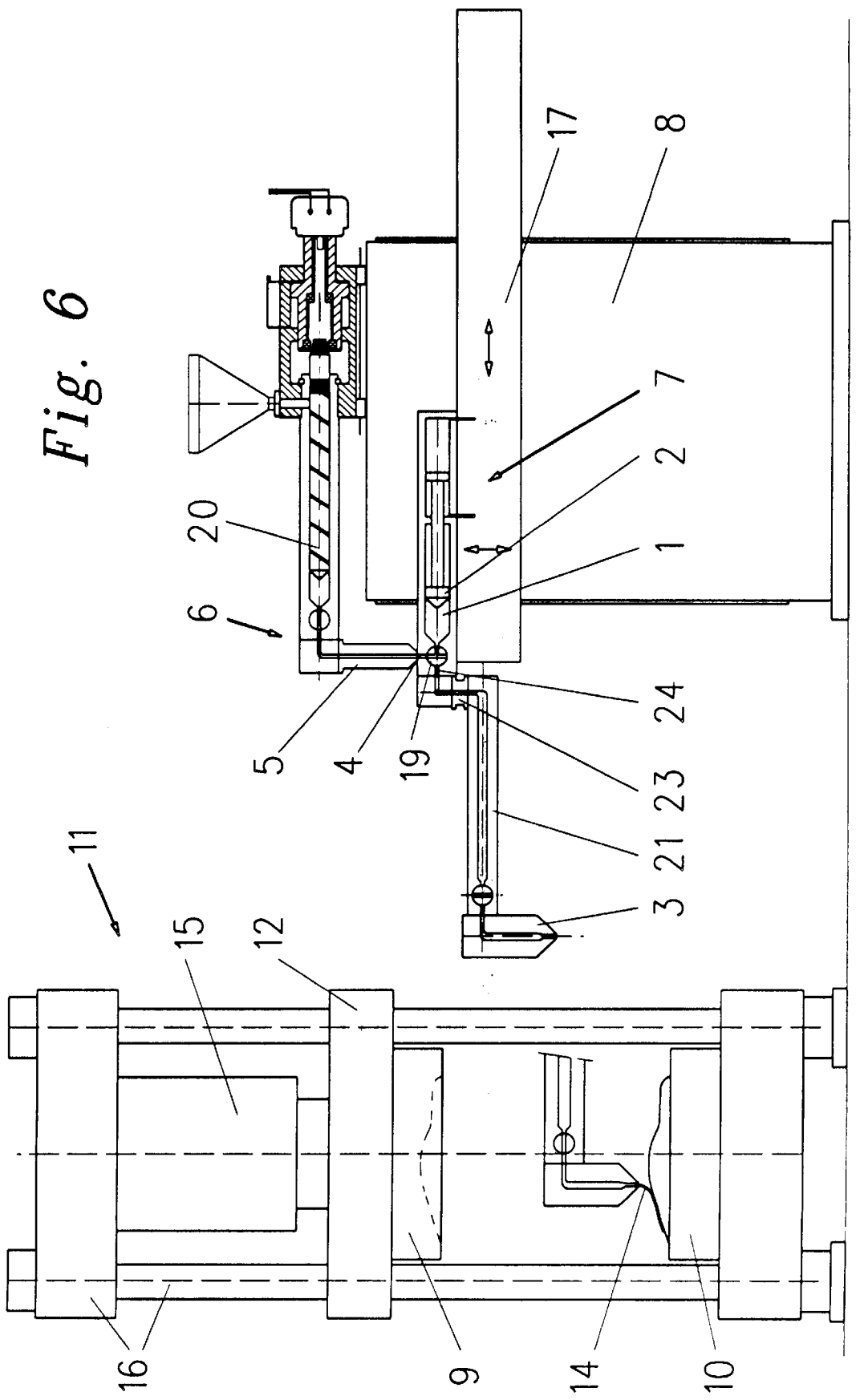
FIG. 6 shows a side view of the molding installation with two melt lines.
Figure 7:
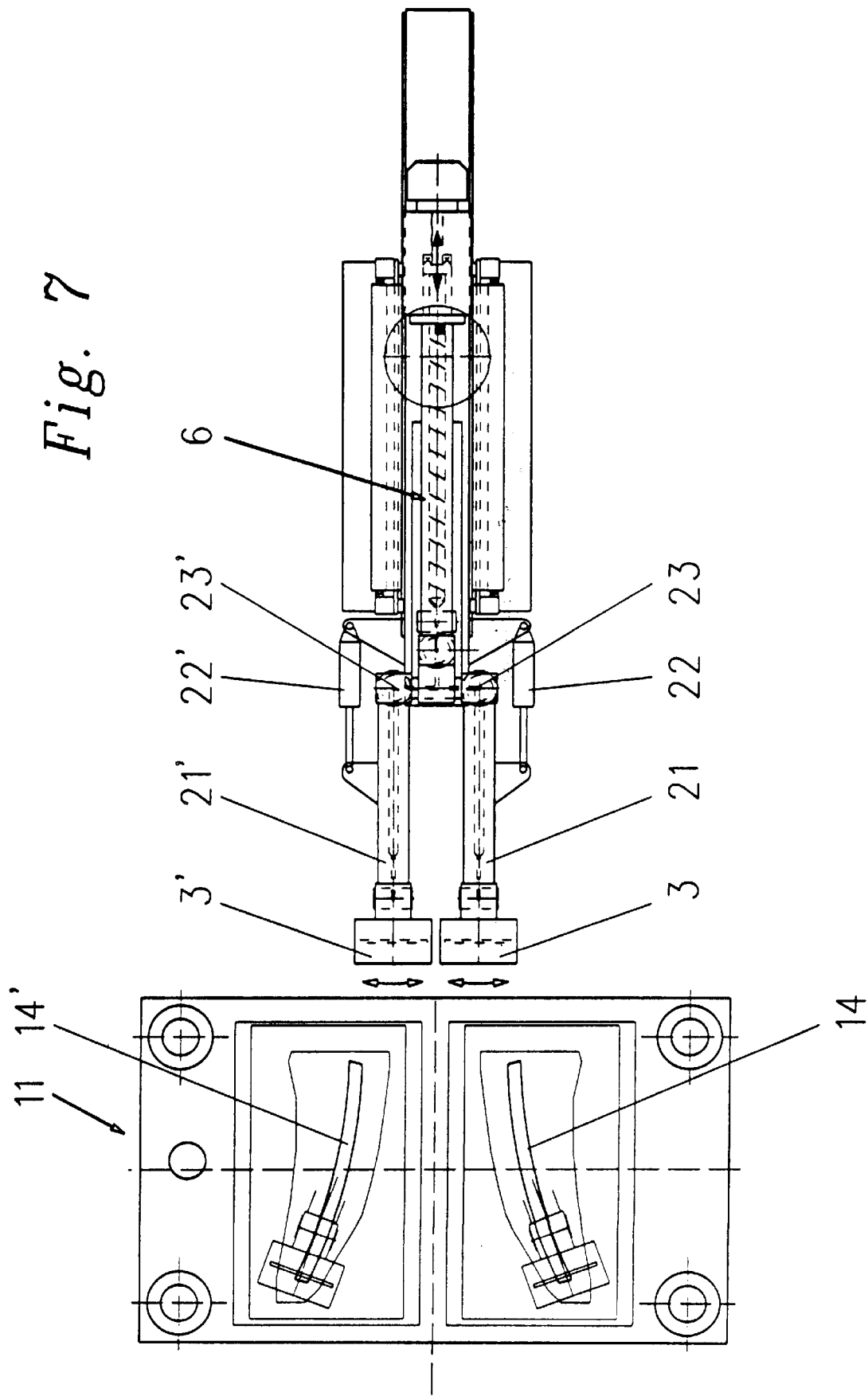
FIG. 7 shows a plan view of the molding installation in accordance with FIG. 6.

When producing a plurality of parts in one operation, in accordance with FIGS. 5 to 7 two injection units 7 and 7' are provided, which are arranged on the coordinate table 8 and synchronously move in between the opened mold halves. FIGS. 6 and 7 show a design in which one injection unit 7 moves in one direction only on the guide rail 17 and two melt strands 14 for producing two molded parts are deposited in a curved path on the mold 10. In this design, at least one, advantageously two melt lines 21 and 21', are articulatedly connected to the gate 24 of the injection unit 7, with melt discharge nozzles 3 arranged at the ends of said lines. The two melt lines 21 can be pivoted about a pivot joint 23 with the aid of in each case one drive element 22 and 22'. In this way it is possible, using a linear movement of the injection unit 7 and a simultaneous pivoting movement of the two melt lines 21 and 21', to deposit two melt strands 14 and 14' in a curved path on of more male molds 10.

What is claimed is:

1. Molding installation for the production of molded parts from plastic, in which a molding compound is plasticized in an extruder unit and is introduced by at least one injection unit into the mold of a corresponding compression-molding unit, which mold comprises a female mold and a male mold, wherein the at least one extruder unit and the at least one injection unit comprise two independent units which are arranged on a coordinate table, it being possible to couple and uncouple the at least one injection unit to and from the at least one extruder unit and to move the at least one injection unit towards the corresponding compression-molding unit.

2. Molding installation according to claim 1, wherein the at least one injection unit is adapted to be displaced between the at least one extruder and the corresponding compression-molding unit by a guide rail.

3. Molding installation according to claim 2, wherein the guide rail is arranged on the coordinate table such that it is adapted to be raised and lowered, displaced longitudinally, and pivoted.

4. Molding installation according to claim 1, wherein the at least one injection unit comprises a cylindrical storage chamber, which is delimited on one side by an axially displaceable, driven injection plunger and on the other side by a deposition nozzle.

5. Molding installation according to claim 4, wherein the storage chamber of the at least one injection unit is adapted to be coupled to a die ring of the at least one extruder via an orifice which is fitted with a two-way valve.

6. Molding installation according to claim 1, wherein the at least one extruder is fixedly attached to the coordinate table.

7. Molding installation according to claim 1, wherein the at least one extruder unit comprises a plurality of extruder units.

8. Molding installation according to claim 2, wherein the at least one injection unit comprises two injection units which are horizontally moveable away from and toward one another over a transverse rail, which is arranged on the guide rail, and are adapted to be fixed to the transverse rail.

9. Molding installation according to claim 1, wherein the at least one injection unit comprises a plurality of injection units which are adapted to be fed by the at least one extruder and are adapted to be coupled to and uncoupled from the at least one extruder.

10. Molding installation according to claim 1, wherein the at least one injection unit is a plasticizing and injection unit with an ejection/plasticizing screw which delivers melt strand.

11. Molding installation according to claim 1, wherein the at least one extruder is pivotably and/or displaceably mounted on the coordinate table and is adapted to be moved between one or more compression-molding units.

12. Molding installation according to claim 1, wherein the at least one injection unit includes two gates which are connected, via pivot joints, to two melt lines, and each melt line is adapted to be pivoted, with the aid of a drive element, about a center axis of a pivot joint.

13. Molding installation according to claim 12, wherein the gates of the melt lines are adapted to be raised and lowered.

14. Molding installation according to claim 1, wherein the at least one injection unit is arranged such that it is displaceable between the coordinate table and the corresponding compression-molding unit by a guide rail.

15. A plasticization and injection installation for use in the production of molded plastic parts, the installation comprising a plasticizing extruder unit and an injection unit, wherein the injection unit is adapted to be coupled to and uncoupled from the extruder unit, and wherein, when the injection unit is uncoupled from the extruder unit, the injection unit is adapted to move independently of the extruder unit.

16. The installation as claimed in claim 15, wherein the injection unit is moveable in three axes when uncoupled from the extruder.

17. The installation as claimed in claim 15, wherein the extruder unit and injection unit are independently mounted on a coordinate table.

18. The installation as claimed in claim 15, further comprising a compression-molding unit having a mold;

wherein, when coupled to the extruder unit, the injection unit receives molding compound from the extruder unit;

wherein, when uncoupled from the extruder unit, the injection unit is adapted to move toward and away from the compression-molding unit; and wherein the uncoupled injection unit is adapted to introduce the molding compound into the mold.

19. A plasticizing and injection installation for use with a compression-molding unit having a mold in the production of molded parts from plastic, the installation comprising:

a coordinate table;

a plasticizing extruder unit mounted on the coordinate table; and an injection unit mounted on the coordinate table;

wherein the extruder unit and injection unit are adapted to be coupled to introduce a molding compound from the extruder unit into the injection unit;

wherein the extruder unit and injection unit are adapted to be subsequently uncoupled and the injection unit is adapted to move toward and away from the compression-molding unit without moving the extruder unit; and wherein the injection unit is adapted to introduce the molding compound into the mold.

* * * * *